United States Patent
Bechade

[11] Patent Number: 5,923,574
[45] Date of Patent: *Jul. 13, 1999

[54] OPTIMIZED, COMBINED LEADING ZEROS COUNTER AND SHIFTER

[75] Inventor: Roland Albert Bechade, South Burlington, Vt.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/716,591

[22] Filed: Sep. 18, 1996

[51] Int. Cl.⁶ ........................................... G06F 5/01
[52] U.S. Cl. ................. 364/715.04; 364/715.08
[58] Field of Search ........................ 364/715.04, 715.03, 364/715.08

[56] References Cited

U.S. PATENT DOCUMENTS

| | | | |
|---|---|---|---|
| 4,247,891 | 1/1981 | Flynn et al. | 364/200 |
| 4,926,369 | 5/1990 | Hokenek et al. | 364/748 |
| 5,010,508 | 4/1991 | Sit et al. | 364/748 |
| 5,040,138 | 8/1991 | Maher, III | 364/748 |
| 5,241,490 | 8/1993 | Poon | 364/715.04 |
| 5,343,413 | 8/1994 | Inoue | 364/715.04 |
| 5,483,476 | 1/1996 | Horen et al. | 364/715.04 |
| 5,513,362 | 4/1996 | Urano et al. | 364/715.04 |
| 5,627,774 | 5/1997 | Schwarz et al. | 364/715.04 |
| 5,633,819 | 5/1997 | Brashears et al. | 364/715.04 |

OTHER PUBLICATIONS

IBM Technical Disclosure Bulletin vol. 17 No. 10 Mar. 1975 EN874–0079 REB 52–600 "Handling Leading Zeros In A Data Processing Unit" by D. N. Gooding and E. M. Shimp.

*Primary Examiner*—David H. Malzahn
*Attorney, Agent, or Firm*—Whitham, Curtis & Whitham; Eugene I. Shkurko

[57] ABSTRACT

By combining a count leading zero circuit with a bit shifter in a digital processor though detection of groups of leading zeros prior to completion of counting of leading zeros, shifting for normalization and number format conversion can concurrently be initiated and partially carried out prior to completion of a determination of the number of leading zeros in an expression of a number. The combined count leading zero circuit and shifter provides faster operation which can be completed within one cycle time and hardware architecture simplifications are achieved to reduce required circuit element count and chip space.

9 Claims, 4 Drawing Sheets

IMPROVED DESIGN

IMPROVED DESIGN

OPTIMIZED, COMBINED LEADING ZEROS COUNTER AND SHIFTER

BACKGROUND OF THE INVENTION

1. Field of the Invention

The present invention generally relates to floating point mathematical data processors and, more particularly, to arrangements for converting the format of binary numbers to an expanded, high-resolution format for mathematical processing.

2. Description of the Prior Art

Programmed digital data processors are particularly suited to the performance of extended repetitive and complex operations on data. In regard to mathematical data, once programmed, a data processor can precisely carry out complex computational algorithms for solving or approximating solutions to problems of a complexity which cannot be effectively approached in any other way. Simulations of three dimensional fluid flow systems is an example of such a complex problem.

In complex computations, a particular numerical quantity may be sequentially subjected to numerous separate computations. However, the digital nature of data processors requires that the quantity be expressed in terms of a radix which, unless the expression is of infinite length, may not allow an exact expression of the value of the quantity. Conversely, since any practical processor cannot accommodate expressions of infinite length, many quantities involved in any computation may include slight variations from true values. When such quantities are subjected to numerous sequential computations, often including other quantities having similar slight inaccuracies, the cumulative error can become significant unless compensating adjustments are made.

For this reason, it is the usual practice to periodically store numerical expressions of values used in computations expressed in a so-called single precision (32 bits: 1 sign bit, 8 exponent bits and 23 mantissa bits) or double precision (64 bits: 1 sign bit, 11 exponent bits and 52 mantissa bits) format having standardized numbers of (generally binary) digits in a mantissa and exponent but to use many more such digits in a so-called extended real (80 bits: 1 sign bit, 15 exponent bits and 64 mantissa bits) or similar format internally of the processor to carry out the computation. The increased resolution of the increased number of digits of the extended real format together with selective use of a plurality of rounding techniques to reduce the expression to single precision or double precision format is quite successful in suppressing cumulative errors to levels smaller than can be reflected in a single-precision or double-precision output or other, lesser, precision as may be specified in the computational algorithm. Of course, it should be understood that the expression of the number value could be stored in extended real or higher resolution format and an even higher resolution format used internally of the processor for computation.

When a number is retrieved from memory for use in a computation or after mathematical operations such as subtraction, multiplication or division, it is not initially known whether or not the number is in a normalized form. Further, after retrieval from storage, the mantissa of the number must also be generally expanded from the format in which it is stored to the format (e.g. extended real format) for use internally of the processor.

Expansion and normalization are generally performed by shifting while accumulating a number for subtraction from the exponent to compensate for the shifting (and which will be retained as a shift value for restoring or reconverting the number when the result is to be stored). For expansion of a normalized mantissa, the number of bits of shifting which is required is generally known from the initial and target number formats. These formats are fairly well standardized at the present time and only a few shift numbers, readily stored in and retrieved from memory, are generally required. Normalization is generally performed separately by detecting the number of leading zeros and shifting by that number of bits. "Handling Leading Zeros in a Data Processing Unit" by Gooding et al., IBM Tech. Discl. Bull., Vol. 17, No. 10, pp. 2844–2845, March, 1975, is exemplary of such arrangements.

Whether or not normalization is necessary will be evident from the logic state of the most significant bit of the number. As a consequence, such shifters have generally been organized to initially shift by small increment (e.g. one bit) and then larger increments (e.g. 2, 4, 8, 16 and 32 bits, in order, the 32 bit shift being generally implemented as two sixteen bit shift operations) so that the most significant bit is initially made available to determine if normalization is necessary. If normalization is not necessary, shifting by a known number of bits remains necessary for number format conversion.

If normalization is thus found to be necessary, shifting for normalization is placed in a processing pipeline subsequent to shifting for conversion from a storage format to an internal processing format. This sequence of separate operations is sufficiently extended that it cannot be done in a single processing cycle and is the longest path in a so-called load special function unit of the processor. Therefore, a processing pipeline is required to accommodate the cycle time objective of modern mathematical processors.

Thus, it can be seen that the sequential operations as well as the pipeline contribute to the time required for computations and memory fetches and storage operations. It may be especially appreciated that while the counting of leading zeros and shifting operations can be carried out very rapidly, the total time required for a complex computation can become extended due to the number of times normalization and format conversion must be performed (e.g. for each computation or small series of computations sufficient to prevent error accumulation) when the counting of leading zeros and shifting must be performed separately and sequentially, even when pipelined.

SUMMARY OF THE INVENTION

It is therefore an object of the present invention to provide an arrangement for combining the functions of counting of leading zeros and shifting.

It is another object of the invention to provide a method and arrangement for performing shifting to accommodate both normalization and format conversion concurrently.

It is a further object of the invention to provide for number normalization and format conversion from a storage format to an internal processing format in a single processing cycle of a mathematical processor.

It is yet another object of the invention to provide an arrangement for counting leading zeros and shifting which avoids the need for a pipelining of those operations.

It is another further object of the invention to provide the functions of counting leading zeros and shifting of bits in an arrangement requiring reduced number of elements and reduced chip space to fabricate.

In order to accomplish these and other objects of the invention, a method of concurrently normalizing and converting the format of a multi-bit number is provided including the steps of detecting if a group of high-order bits of the multi-bit number are all zero, shifting bits of the multi-bit number by a number of bits equal to a number of bits in the group of bits, and counting leading zeros in the multi-bit number concurrently with the detecting and shifting steps.

In accordance with another aspect of the invention, a digital mathematical processor for a multi-bit number is provided including a combined count leading zero circuit and bit shifter, the combined count leading zero circuit and bit shifter including logic for detecting if a group of high-order bits of the multi-bit number are all zero prior to completion of counting of leading zeros, and an arrangement for initiating operation of said bit shifter means in response to said detecting means.

In accordance with a further aspect of the invention, a mathematical processor including a count leading zero circuit for outputting a multi-bit number expressing the number of leading zeros in a digital expression of a number and a bit shifter for shifting bits of said digital expression of a number in accordance with bits of said multi-bit number, including logic for detecting if a group of high-order bits of the digital expression are all zero prior to completion of counting of leading zeros and providing a signal, and an arrangement for substituting said signal for a high-order bit of said multi-bit number.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figures 1, 1A:
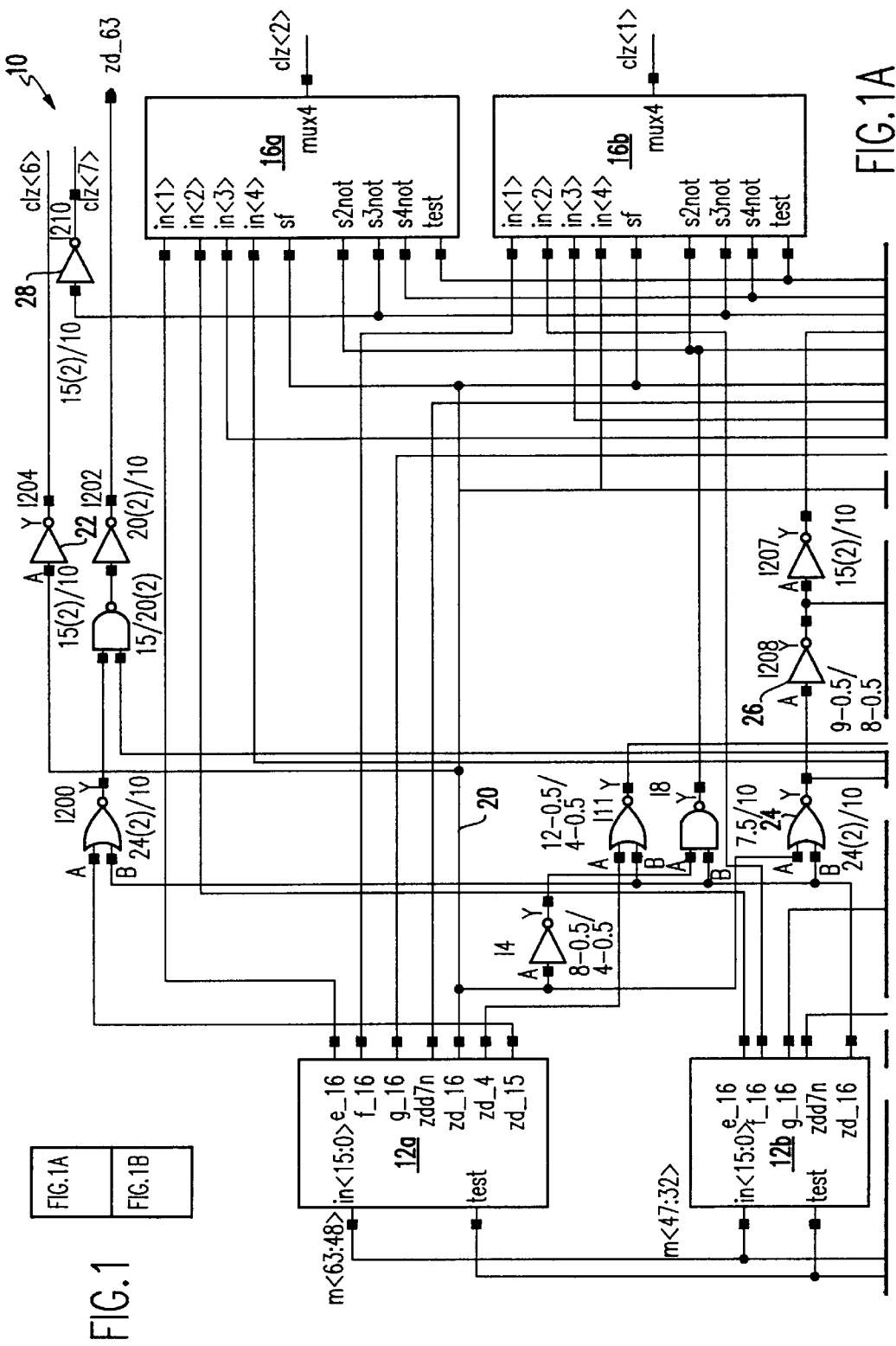
FIG. 1 is a schematic diagram of a count leading zero circuit including adaptations in accordance with the invention.
Figure 1B:
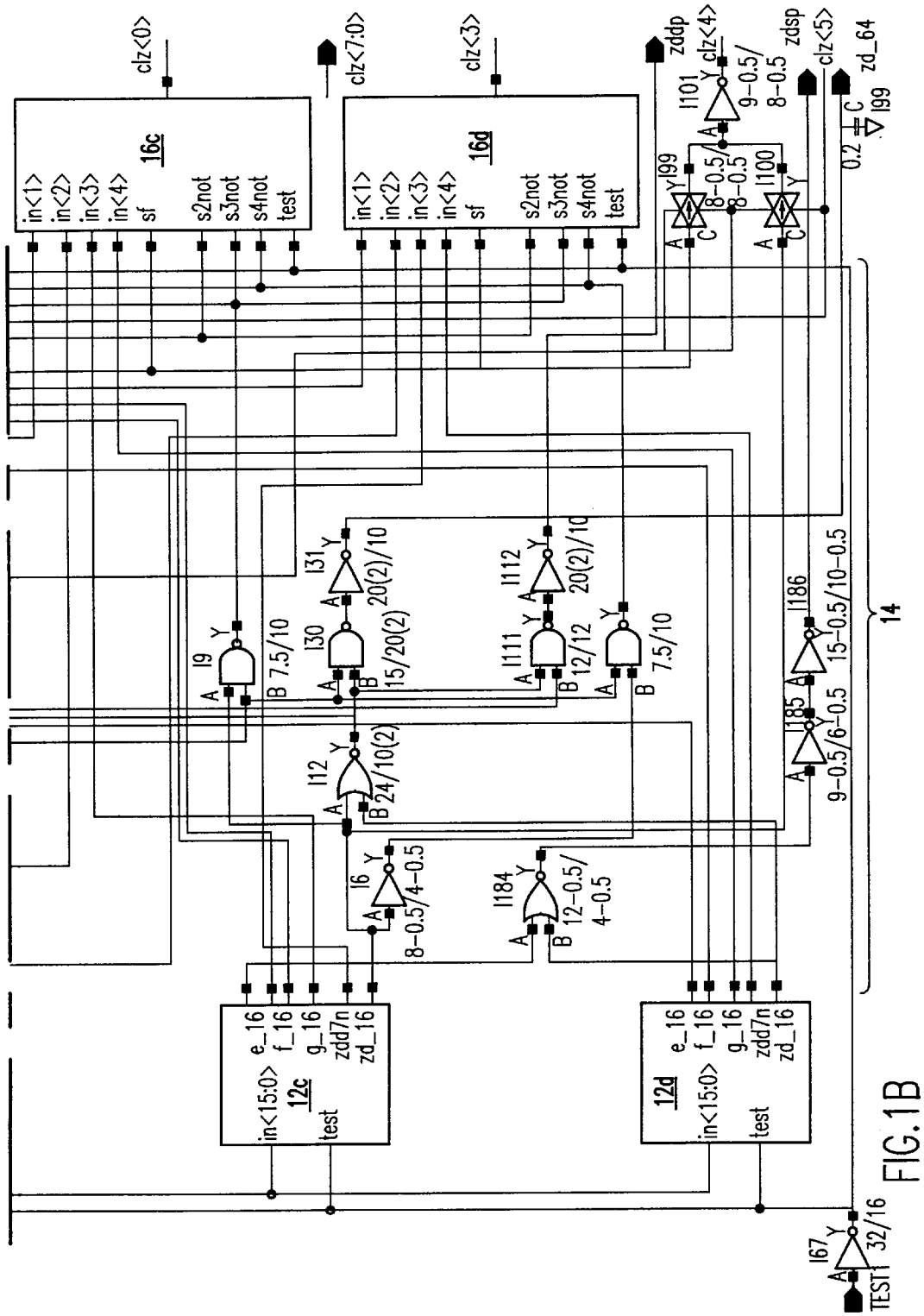

Referring now to the drawings, and more particularly to FIG. 1, there is shown a count leading zero circuit including modifications in accordance with the invention. It is to be understood that the overall organization of the arrangement 10 illustrated is somewhat similar to count leading zero circuits which have been previously implemented in mathematical processors and, in general form and to the extent of development of outputs clz<0>–clz<4>, may be regarded as representative of known leading zero counting arrangements but no portion of FIG. 1 is admitted to be prior art as to the present invention. FIG. 1 is provided largely to show the manner in which the invention derives output signals clz<4>–clz<7> from intermediate logic signals within a count leading zero circuit and the details of the particular circuit of FIG. 1 are not otherwise important to the practice of the invention.

Essentially the arrangement 10 shown in FIG. 1 comprises four logic blocks 12a–12d which are each capable of counting leading zeros in blocks of sixteen bits which are taken from a multi-bit input data signal m<63:0> of up to sixty-four bits. Of course, the arrangement of FIG. 1 could provide for input signals of any bit-length. However, the presently preferred application to a sixty-four bit number will be sufficient for conveying an understanding of how to apply the invention to binary numbers of any size or bit length by increasing the number of logic blocks such as 12a–12d or the use of logic blocks which accommodate longer bit strings.

Each of logic blocks 12a–12d is of a well-understood design, the details of which are unimportant to the practice of the invention. Each of the logic blocks has at least four outputs, d, e, f and g, for providing a four-bit binary number indicative of the number of contiguous high-order bits that have a value of zero. Each of the logic block 12a–12d also preferably includes at least fifth output which indicates that all sixteen bits are zero. Other outputs may also be provided as may be desired and may be of use in simplifying the intermediate logic 14 of the count leading zero circuit 10.

Six bits of output clz<0>–clz<5> are required to specify a number of bits of shifting equal to the length of the preferred sixty-four bit mantissa in the extended real format to cover the possible number of leading zeros therein. These outputs are derived from multiplexers 16a–16d or, in accordance with the invention, a portion of the intermediate logic 14. The remainder of the intermediate logic is simply logic which provides signals from count leading zero logic blocks 12a–12d to appropriate data and selection inputs of multiplexers 16a–16d. Again, the details of how outputs clz<0>–clz<5> may be developed are well-understood by those skilled in the art and, in any event, not critical to the practice of the invention other than the development of clz<4> (and clz<5>) from intermediate logic 14.

The modification of the count leading zeros circuit 10 from count leading zero circuits as previously implemented is the taking of output signal clz<4> and additional output signals clz<6> and clz<7> from the intermediate logic 14. Specifically, logic block 12a receives the highest-order sixteen bits of input m<63:48> and, if all of these bits are zero (e.g. leading zeros) outputs a signal on line 20 which is preferably buffered as indicated by inverter 22 to increase drive capability and output as clz<6>. Thus, if the first sixteen bits are all zero, the shifter can be immediately (e.g. four logic delays prior to the availability of clz<0>) controlled to begin an initial shift of sixteen bits.

It should be noted, in this regard, that previous shifter arrangements began shifting by the smallest possible increment of one bit in order to inspect the most significant bit for a one in order to determine if normalization is necessary. In the case of the invention, if the most significant bit is a one, the most significant sixteen bits will not be reported as all zero and the sixteen bit shift operation will not occur under control of clz<6>. Therefore, there is no penalty in examining the first sixteen bits of the number and the possibility of immediately initiating a shift by a large increment which can then be carried out in parallel with the operations of intermediate logic 14 and multiplexers 16a–16d and prior to completion of the count leading zero function when the remainder of the leading zero count or shift signals become available.

In a similar fashion, clz<7> is developed to determine if the first thirty-two bits of the number are all leading zeros. After the highest-order bits m<48:63>, provided to logic block 12a, the next-highest-order sixteen bits m<47:32> contiguous with bits m<48:63> are provided to logic block 12b. Even if all of bits m<47:32> are zero, they are not leading zeros if any of bits m<63:48> is a one. Therefore the output of logic block 12a indicating all bits to be zero is combined with a like output of logic block 12b by a simple logic gate such as NOR gate 24, buffered by inverters 26 and 28 to form output clz<7>. The propagation time of clz<7> is slightly longer than that of clz<6> but that increase in propagation time is of no practical consequence in the effective operation of the invention since clz<7> will be available by the time of completion of the first sixteen bit shift operation in order to immediately initiate a second sixteen bit shift operation for a total shift of thirty-two bits and still within the propagation time through the intermediate logic 14 and multiplexers 16a–16d (e.g. three logic delays before clz<0> is available). Again, there is no penalty for detecting zeros in bits m<47:32> in the count leading zeros process while providing the possibility of early initiation of a shift in parallel with the counting of leading zeros.

The remainder of the shifting operation is carried out in the usual manner in accordance with outputs clz<4>–clz<0> except that it is preferred to continue to shift in the largest convenient increments (e.g. 16, 8, 4, 2 and 1 bit). It is important to an appreciation of the meritorious effects of the invention that clz<4> is also preferably derived from the intermediate logic 14 in much the same way as clz<6> and clz<7> and is thus also made available prior to clz<0>. Thus, the "worst case" (even though the logic delays are incurred whether shifting is actually performed or not) number of shift operations occurs for a shift of fifteen bits and requires a maximum of only four shift operations (by 8, 4, 2 and 1 bits) after completion of the count leading zero operation (when clz<0>–clz<4> are available from multiplexers 16a–16d) while three shift operations are conducted in parallel with and prior to completion of the count leading zero operation.

It should be appreciated that the parallel functioning of the count leading zeros circuit 10 and the shifter effectively combines their functions to accomplish the required shifting operation for normalization in substantially less time. Further, the operation also accommodates shifting for number format conversion whether or not shifting for normalization is also required. Therefore, these operations need not be performed sequentially and pipeline processing is not required for either allowing a sequence of shifting for separate purposes or to allow a short cycle time. These effects of the invention and the combining of the count leading zero circuit with the shifter allowing reduction of chip space will become more clear from the following comparison of FIGS. 2 and 3, as will now be discussed.

It will be recalled from the foregoing that shifting by a specific number of bits is characteristic of number format transformation and may or may not involve normalization. Normalization may or may not be necessary, depending on whether or not leading zeros are present. If normalization is required in addition to the shifting required for number format conversion, the additional amount of shifting is dependent on the number of leading zeros which are present after shifting for number format conversion. Further, since number format conversion is necessary whenever a number is retrieved from storage and storage and retrieval are performed with high frequency (e.g. for each calculation or small group of calculations) to prevent error accumulation, it has been generally preferred to provide for unconditional shifting when format conversion is required and to add the function of normalization when needed. However, since the addition of normalization processing to the procedure, itself, requires some processing overhead including the counting of leading zeros, it has been the method of choice to begin shifting with a single bit shift increment to first determine if normalization will be necessary, then to suspend shifting for normalization and complete the shifting for format conversion while the overhead for adding normalization processing is performed and then, separately perform the additional shifting necessary for normalization. Thus, efficiency of prior mathematical processors has dictated the separation of the shifting for normalization and the shifting for format conversion or, more particularly, the separation of the count leading zeros function and structure from the shifting of bits responsive thereto, both functionally and architecturally.

Figure 2:
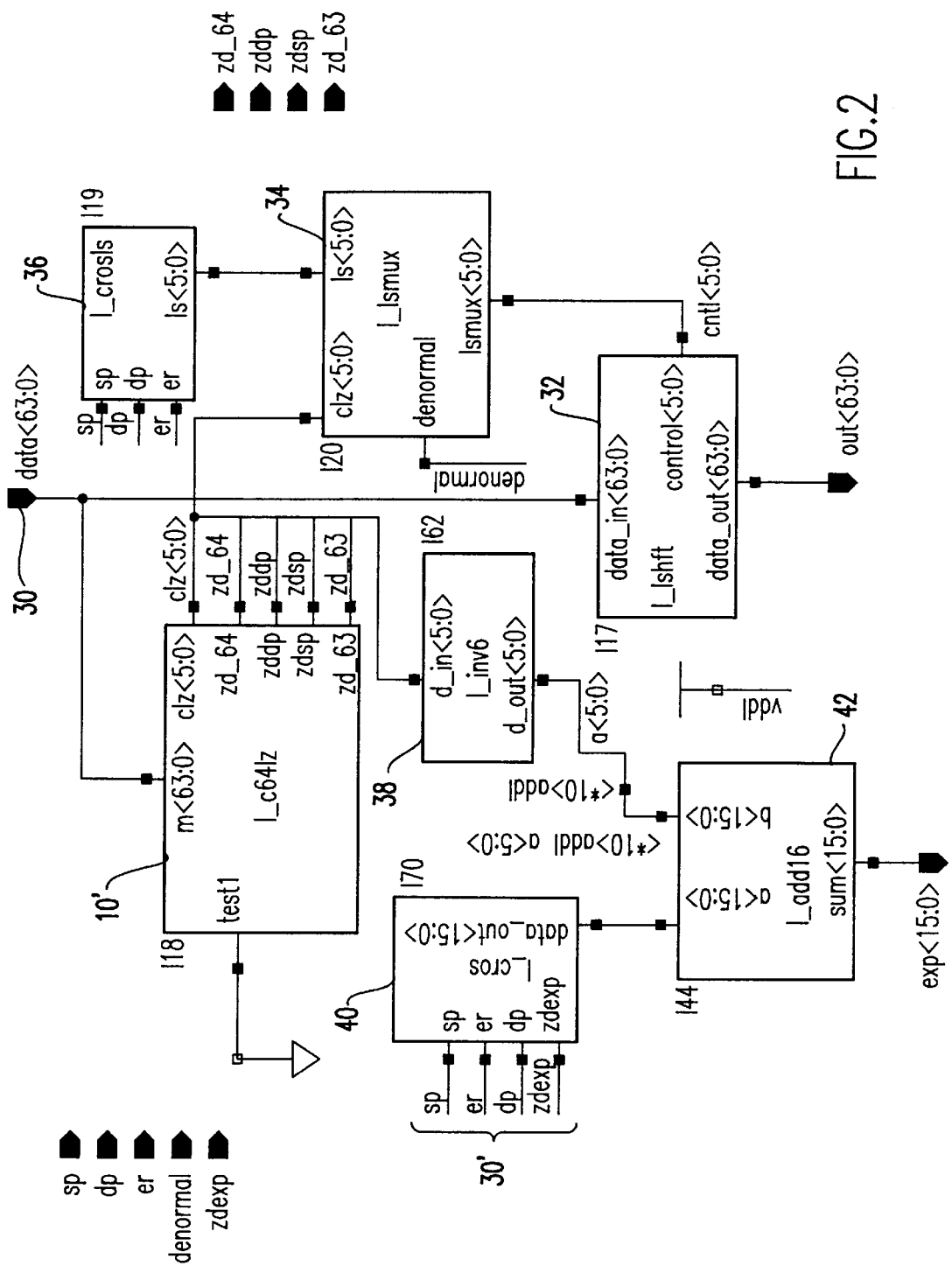
FIG. 2 is a schematic diagram of an arrangement for counting of leading zeros and shifting of bits over which the present invention is an improvement.

Referring now to FIG. 2, the previously implemented architecture and process are schematically depicted. When data is read from memory or otherwise provided to the mathematical processor, the mantissa data<63:0> is applied to a bus 30 and the exponent bits are applied at 30' to element 40 which provides the exponent a<15:0>, as read, over a bus to an adder 42. It will be recalled that for a left-shift operation as is performed for normalization and number format expansion, each bit of shifting requires an decrement of one in the binary representation of the exponent portion of the number format while a right-shift requires an increment of the exponent for each bit. Decrementing of the exponent thus has previously been preferably done by inversion of the leading zeros count (e.g. using inverter 38) to form a two's complement and addition to effectively subtract the number of bits by which the bits of the number are shifted from the initial exponent value.

The mantissa is provided to a multiplexer 32 and to a count leading zero circuit, possibly such as that of FIG. 1 but designated 10' to indicate that the modifications shown in FIG. 1 in accordance with the invention are not necessary and only outputs clz<0> to clz<5> are relevant to the prior arrangement depicted in FIG. 2 and even clz<4> and clz<5> need not be derived in the manner depicted in FIG. 1. As alluded to above, the format of the number, as input, will be designated by a signal such as sp (single precision), dp (double precision) or er (extended real) which is applied to a small memory 36, possibly embodied in read-only memory, which outputs a number (ls<5:0>) of bits by which the mantissa bits must be shifted (if any) to derive the target format.

The output of the count leading zero circuit 10' and memory 36 are output to a processor 34 which can function as a one-stage or two-stage pipe to develop control signals for multiplexer 32 which also receives data<63:0> and actually performs the shifting operation or operations. (As alluded to above, propagation of a signal through multiplexer 32 requires the same amount of time regardless of the amount of shifting or whether shifting is actually performed or not.)

The first stage of the pipe provided by processor 34 detects whether or not the number is normalized (if the number of leading zeros is zero) or not ("denormal") and, if the number is normalized provides control signals to control shifting by the multiplexer 32 in accordance with the number derived from memory 36. If the number is denormal, processor 34 disables latching of number from memory 36 and provides a second stage to control shifting in accordance with each of the bits of clz<0>–clz<5> in ascending order of shift by 0/1 bit shift by 0/2 bits, shift by 0/4 bits, . . . shift by 0/32 (or 0/16) bits in accordance with outputs cntl<5:0>. Accordingly, the multiplexer 32 provides shifting by connecting each input bit to an output out<63:0> which may or may not be offset from the input in dependence on whether or not shifting by a particular number of bits is to be done.

Thus it is seen that not only must the count of leading zeros be completed prior to functioning of the first stage of pipe 34, but that generation of control signal to perform shifting will often require the addition of a second stage to the pipe and that processing completed, following processing by the first stage of the pipe, before the shifting process in multiplexer 32 initiated. Therefore, the count leading zero function is necessarily separated in time from the shifting operation.

As generally and optimally implemented, the hardware architecture of the arrangement of FIG. 2 also requires an 84-bit register to buffer input/output and 84-bit 2-way multiplexer to control data transfer, a 6-bit constant read-only memory 36, a 6-bit 2-way multiplexer in processor 34 and registers and multiplexers to buffer and direct numerous control signals. The total number of circuit elements in these required structures and the many connections between them necessitates a substantial amount of chip space in the processor as well as substantial design complexity and expense of fabrication.

Figure 3:
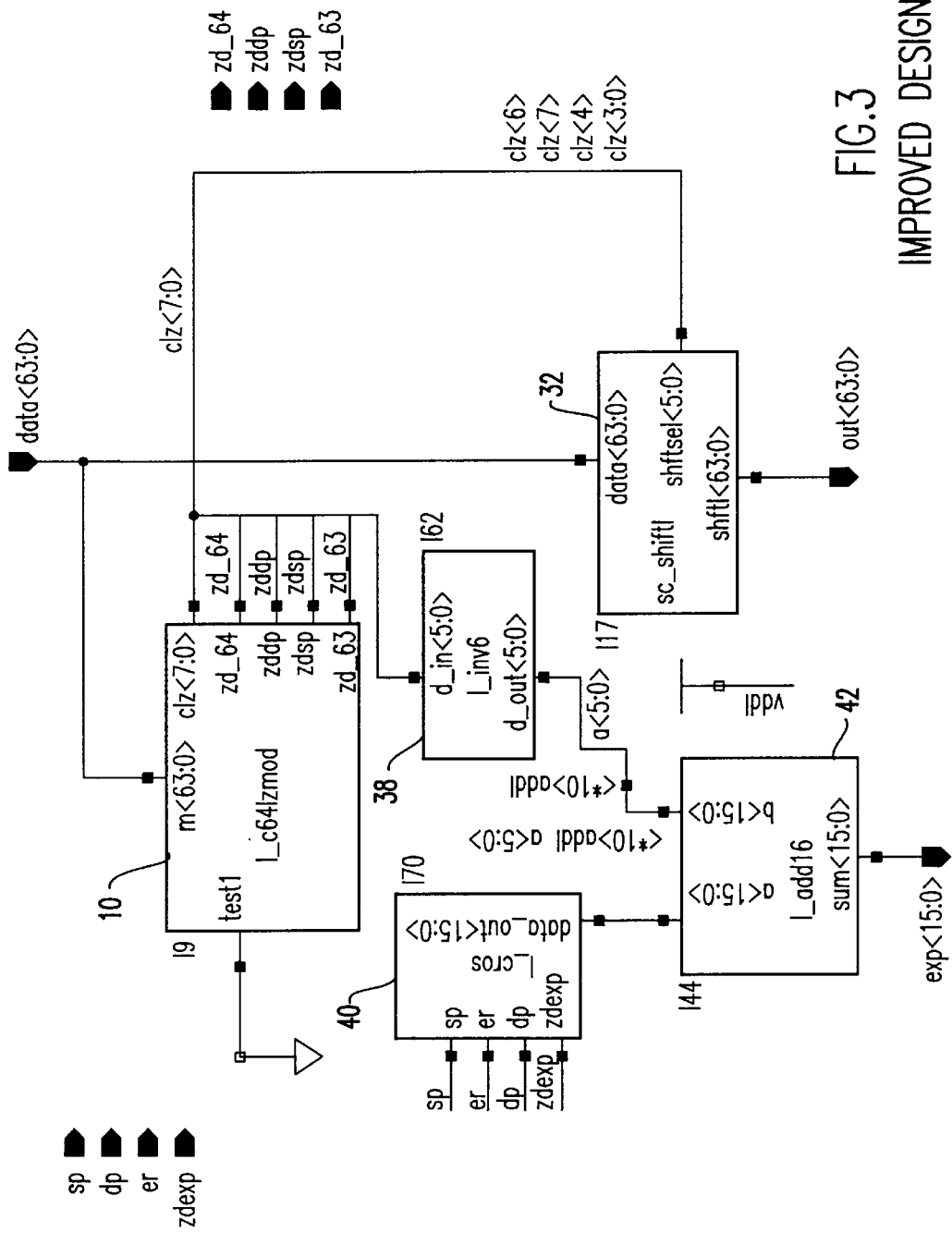
FIG. 3 is a schematic diagram of an arrangement combining shifting and leading zero counting in accordance with the invention.

In contrast, in the depiction of the arrangement in accordance with the invention of FIG. 3, the input mantissa data<63:0> is provided to shifter 32, as discussed above with reference to FIG. 2, and to the count leading zero circuit 10 of FIG. 1. The clz<5:0> bits provided by count leading zero circuit 10 are provided to inverter 38 and the exponent is incremented or decremented in accordance with the direction and magnitude of shift generally as described above. It should be noted that the leading zero information which may cause generation of 16-bit and 32-bit shifts as described above under control of clz<6> and clz<7> is also contained in clz<5> so that clz<6> and clz<7> need not be considered in computation of the exponent when the number is normalized. By the same token, CLZ<5> is not necessary to control shifting in the arrangement of FIG. 3.

As noted above, clz<6>, clz<7> and clz<4> are developed and are available in sequential order before the remainder of the leading zero count (clz<3:0>) is complete or available and may be applied as soon as they occur to shifter/multiplexer 32 to carry out shifting operations in parallel with the count leading zero operation. In this way, both the functions and architectures of the count leading zero circuit and the shifter/multiplexer 32 are combined. The simplification of the combined architectures allows the omission of the registers, multiplexers and connections described above as necessary in the arrangement of FIG. 2 with consequent saving of chip space. Further, it should be noted that the shifting required for format conversion is now implicit and automatic in the arrangement of FIG. 3 in which the shifter and count leading zero circuit are combined, allowing omission of the memory 34 and associated buffer, multiplexer and connections and resulting in further saving of chip space and design and manufacturing complexity.

In view of the foregoing, it is seen that the combined and optimized count leading zero circuit and shifter/multiplexer in accordance with the invention provides concurrent normalization and format conversion as well as performing a substantial portion of the shifting operation concurrently with the count leading zero operation. Further, the invention provides a substantial reduction in the number of required circuit elements with consequent savings in chip space and design and manufacturing complexity while allowing both number normalization and format conversion to be carried out much more rapidly and within a single and short cycle time.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of concurrently normalizing and converting the format of a multi-bit number including the steps of
    developing in sequential order a number of leading zeros in a group of N bits, where M×N is a total number of bits in said multi-bit number to be normalized,
    detecting if a group of high-order bits of said multi-bit number are all zero,
    shifting bits of said multi-bit number by a number of bits equal to a number of bits in said group of high-order bits when said group of high-order bits are all zero, and
    counting leading zeros in said multi-bit number concurrently with said detecting, shifting and developing steps.

2. A method as recited in claim 1, including the further steps of
    detecting if a second group of bits contiguous with said group of high-order bits of said multi-bit number are all zero,
    shifting bits of said multi-bit number by a number of bits equal to a number of bits in said second group of bits prior to completion of said counting step when said second group of high-order bits are all zero.

3. A method as recited in claim 2, including the further steps of
    detecting if a third group of bits contiguous with said second group of bits of said multi-bit number are all zero,
    shifting bits of said multi-bit number by a number of bits equal to a number of bits in said third group of bits prior to completion of said counting step when said third group of high-order bits are all zero.

4. A method as recited in claim 1, including the further step of
    decrementing an exponent of said multi-bit number by a number equal to the number of leading zeros in said multi-bit number.

5. A digital mathematical processor for a multi-bit number including a combined count leading zero circuit and bit shifter means, said combined count leading zero circuit and bit shifter means including
    means for developing in sequential order a number of leading zeros in a group of N bits, where M×N is a total number of bits in said multi-bit number to be normalized;
    means for detecting if a group of high-order bits of said multi-bit number are all zero prior to completion of developing of said leading zeros, and
    means for initiating operation of said bit shifter means in response to said detecting means.

6. A processor including said combined count leading zero circuit and bit shifter means as recited in claim 5, further including
    means for shifting bits of said multi-bit number by a number of bits equal to a number of bits in said group of bits concurrently with counting of leading zeros responsive to said means for detecting and means for initiating.

7. A processor including said combined count leading zero circuit and bit shifter means as recited in claim 6, further including means for detecting if a second group of bits contiguous with said group of high-order bits of said multi-bit number are all zero, means for controlling shifting of bits of said multi-bit number by a number of bits equal to a number of bits in said second group of bits prior to completion of said count leading zeros circuit.

8. A processor including said combined count leading zero circuit and bit shifter means as recited in claim 7, further including means for detecting if a third group of bits contiguous with said second group of bits of said multi-bit number are all zero, means for controlling shifting of bits of said multi-bit number by a number of bits in said third group of bits prior to completion of said count leading zeros circuit.

9. A mathematical processor including count leading zero circuit means for outputting a multi-bit number expressing the number of leading zeros in a digital expression of a number bit shifting means for shifting bits of said digital expression of a number in accordance with bits of said multi-bit number means for detecting if a group of high-order bits of said digital expression of a number are all zero prior to completion of counting of leading zeros and providing a signal, said means for detecting being responsive to said count leading circuit means, and means for substituting said high-order bit of said multi-bit number outputted from said count leading circuit means.

* * * * *